W. MABLE.
BEET LOADER.
APPLICATION FILED JUNE 14, 1919.
1,378,705.
Patented May 17, 1921.
2 SHEETS—SHEET 1.
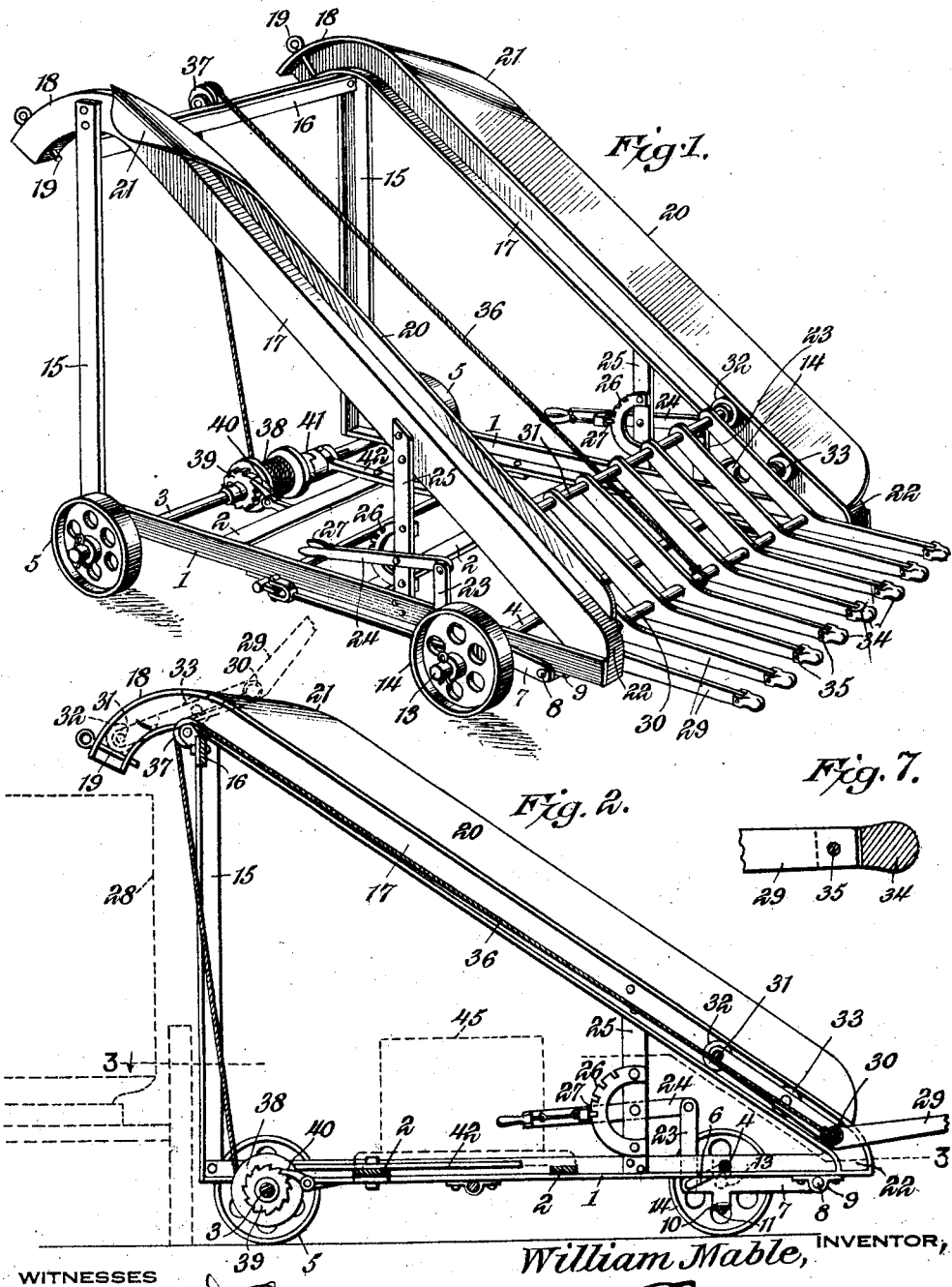
WITNESSES
Howard D. Orr.
F. J. Chapman.
William Mable, INVENTOR,
BY E. G. Siggers
ATTORNEY W. MABLE.
BEET LOADER.
APPLICATION FILED JUNE 14, 1919.
1,378,705. Patented May 17, 1921.
2 SHEETS—SHEET 2.
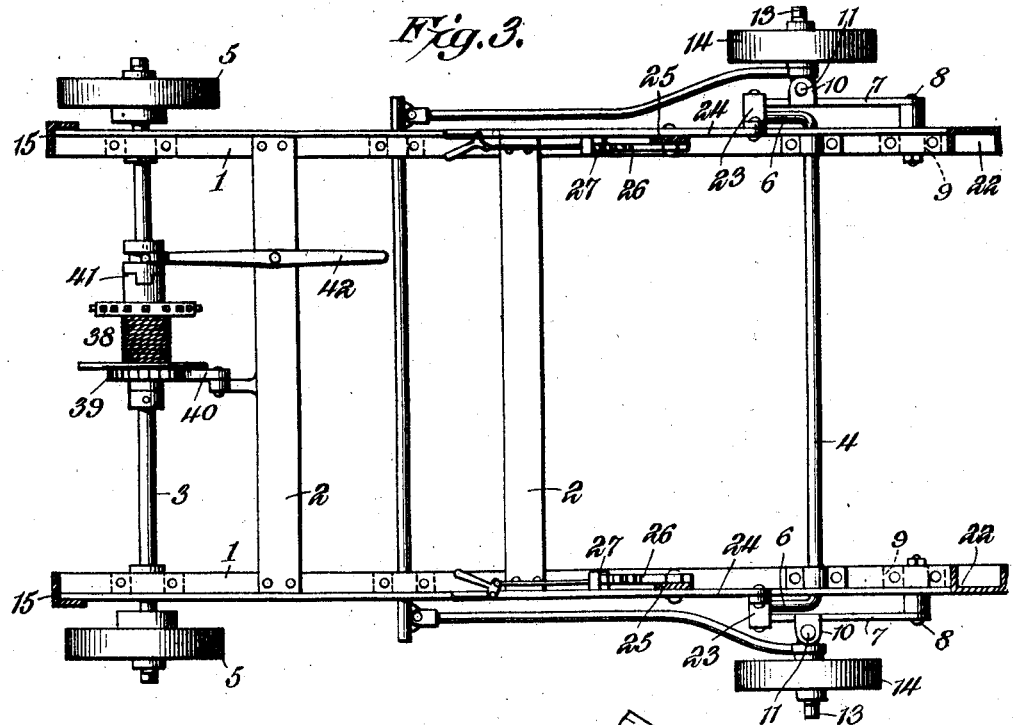
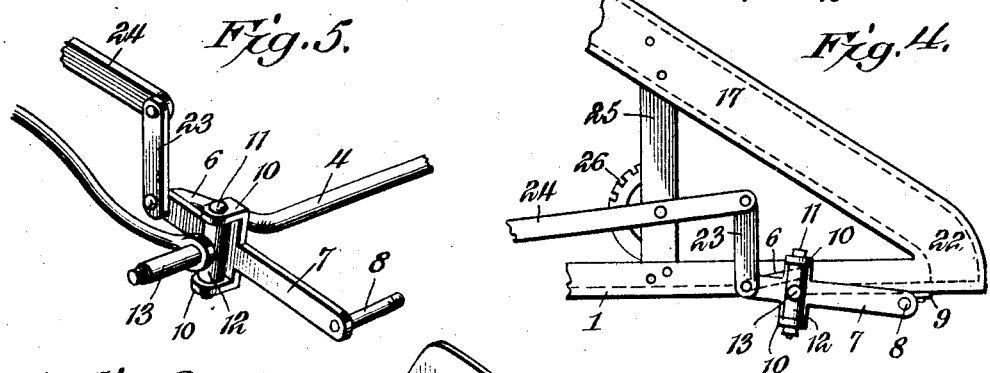
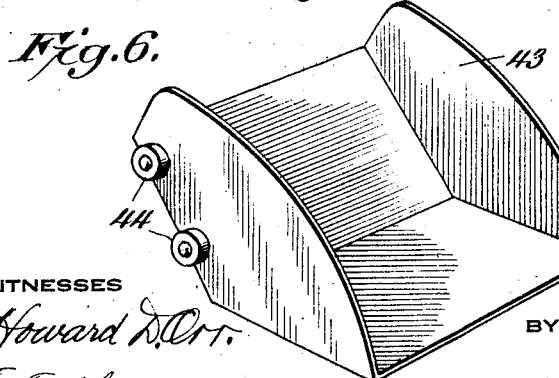
WITNESSES
Howard D. Ort.
F. T. Chapman.
William Mable,
INVENTOR,
BY

UNITED STATES PATENT OFFICE.

WILLIAM MABLE, OF FORT COLLINS, COLORADO, ASSIGNOR OF FORTY-NINE ONE-HUN-DREDTHS TO CARL C. CHRISTENSEN, OF FORT COLLINS, COLORADO.

BEET-LOADER.

1,378,705.  Specification of Letters Patent.  Patented May 17, 1921.

Application filed June 14, 1919. Serial No. 304,185.

*To all whom it may concern:*

Be it known that I, WILLIAM MABLE, a citizen of the United States, residing at Fort Collins, in the county of Larimer and State of Colorado, have invented a new and useful Beet-Loader, of which the following is a specification.

This invention has reference to loaders for loading material onto wagons or other vehicles, and its object is to provide a portable loader more particularly adapted for use in connection with beets.

In accordance with the invention there is provided a vehicle which may be power driven after the manner of an automobile, with the automobile chassis forming the frame of the vehicle. Wheels are provided, with two of the wheels constituting steering wheels, and the steering wheels may be so constructed as to raise and lower what may be termed the front of the vehicle.

Mounted on the vehicle frame is an inclined runway suitably framed up and having channel tracks set at an incline, say forty-five degrees more or less. Fitted to the tracks so as to travel therealong in an inclined path is a beet-carrying fork or a beet pulp shovel, these two structures being interchangeable, while a winding drum is provided for pulling the fork or shovel, as the case may be, up the inclined track, the latter being formed to cause the automatic dumping of the fork or shovel on reaching the top of the inclined track.

The invention has particularly to do with the fork or shovel having rollers on the side and traveling in the channels forming the track, together with the construction of the fork, and other features.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Figure 1 is a perspective view of the beet loader.

Fig. 2 is a longitudinal vertical section thereof.

Fig. 3 is a section on the line 3—3 of Fig. 2.

Fig. 4 is a side elevation of the forward end of one side of the frame drawn on a larger scale than the preceding figures and omitting the beet carrier.

Fig. 5 is a perspective view of the steering wheel spindle.

Fig. 6 is a perspective view of the pulp shovel.

Fig. 7 is a detail of the outer end of one of carrier fingers.

Referring to the drawings, there are shown side bars 1 and cross bars 2 constituting the main frame or chassis of the device and may be considered as representative of any suitable vehicle frame of the automobile type, although the invention is not confined to any particular type of vehicle and any suitable form of self-propelling vehicle may be used. The frame is mounted upon axles 3, 4, shown in the drawings as simple axles.

For convenience of description, the axle 3 may be considered as the rear axle and the axle 4 as the front axle. The rear axle carries rear wheels 5 and the front axle 4 has crank extremities 6 each mounted at its outer end in one end of a rock bar 7, the other end of which is mounted on a pivot or stud 8 journaled in a bearing 9 carried by a respective one of the side bars 1. Between the ends of each rock bar 7 are laterally extended opposed angle ears 10 carrying a pin or arbor 11 upon which is mounted a sleeve 12 carrying a wheel arbor 13 for the respective forward wheel 14 of the vehicle.

Carried by the side bars 1 at the rear ends thereof are posts 15 rising to a suitable height and connected together at the tops by a cross bar 16. Carried by the forward end of each side bar 1 and the upper end of each post 15 is an inclined track 17 of channel form, with the open side of each channel facing the corresponding side of the other channel. The upper end of each channel track 17 has a curved extension 18 directed downwardly and is provided with perforations for the passage of a pin or bolt 19 near the extremity of the curved end of the channel. Moreover, each channel bar has along its upper edge a longitudinally extended shield 20 which, at the upper edge, is outwardly and downwardly curved, as shown at 21. The lower end of each channel 17 is downwardly curved, as shown at 22, and closed.

That end of each bar 7 remote from its pivot support 8 is carried by a link 23 in turn carried by one end of a lever 24 fulcrumed to a brace 25 extending between each side bar 1 and the channel 17 on the same side of the machine, thus aiding in the support of the channel bar or track 17. The lever 24 is pivoted or fulcrumed at the center of a toothed segment 26 fast to the brace 25 and each lever 24 is provided with a thumb latch 27 acting with the toothed segment 26 to hold the lever in various adjusted positions. The purpose of the lever 24 is to permit raising and lowering of the wheel 14 on the same side of the machine so that the forward end of the machine may be raised and lowered, as desired, by the manipulation of the levers 24, thus varying the distance of the forward lower end of the track members 17 above the ground.

In order to gather beets for loading onto a wagon, which latter is indicated in dotted lines at 28 in Fig. 2, there is provided a carrier which, on account of its construction, may be termed a fork since it includes a suitable number of fingers or tines 29 each having a bend at an intermediate point so that each tine is of angle shape. The tines of the fork are joined together at the angle portion by an transverse rod 30 and at one end by another transverse rod 31, the second rod being located at what may be termed the upper end of the beet carrier. The rod 31 extends beyond the side tines 29 and at each end the rod 31 carries a roller 32 so arranged as to travel in a respective one of the channels 17. Spaced from the roller 32 is another roller 33 located between the two rods 30 and 31 and also arranged to travel in the respective channel 17. The angle of the tines 29 is such that the rollers 32 and 33 when traveling along the inclined portions of the channels 17 will hold the fork with the other ends of the tines about horizontal, while the extremities of the tines may be brought, by the manipulation of the levers 24, into close relation to the ground. At the forward end of each tine 29 there is pivoted a block 34 of the nature of a ball or enlargement presenting a blunt outer end so as to engage the beets without harm thereto, the pivoting of each block 34 being on an axis which may be approximately horizontal so that the blocks may rise and fall to a limited extent. The pivots for the blocks are shown at 35, Fig. 7.

The fork is drawn up the tracks 17 by means of a rope or cable 36 traveling over a pulley 37 on the cross bar 16 and then extended downwardly to a winding drum 38 on the rear axle 3. The winding drum is provided with a ratchet 39, and a pawl or latch 40 carried by one of the cross bars 2 may be utilized to hold the drum from reverse movement and permit it to be freed when it is desired to have the fork gravitate to the lower end of the tracks. In order to actuate the drum in the winding direction a clutch 41 is provided, which clutch is driven by the rear axle and is under the control of a clutch lever 42.

Instead of providing a beet fork an angular shovel 43 may replace the beet fork and is provided with rollers 44, corresponding to the rollers 32 and 33, for traveling in the tracks 17. The shovel 43 is useful in loading beet pulp from silos and the like. To exchange the fork and shovel the pins or bolts 19 are removed, whereupon the fork or shovel may be withdrawn from the upper ends of the tracks and the other elevating carrier may be inserted therein, after which the pins or bolts are replaced.

When the fork or shovel, as the case may be, is drawn up the tracks it will tip about the curved sections 18 until the uppermost rollers strike the pins 19 and the carrier is tilted to the dumping position, indicated in dotted lines in Fig. 2.

No attempt has been made to show any type of driving means for the structure, but in Fig. 2 a dotted rectangle 45 is to be taken as indicative of any suitable power unit, such as an explosion engine.

In the drawing the fork or carrier is shown as provided with flat tines set on edge, but it will be understood that piping may be used for the same purpose. One rod carrying and spacing the tines is continued to provide journal bearings for the rollers 32, while the rollers 33 are carried by the outermost ones of the tines between rollers 32 and the intermediate rod 30. This forms a particularly rigid and strong, but light construction. The blocks or balls 34 prevent any entering of the tines into the ground and also prevent any injury to the beets.

By employing channel tracks with the openings in the channels facing each other the construction is materially simplified since four rollers are ample and the channel tracks aid materially in imparting rigidity to the structure where most needed. While the loader is intended more particularly for beets it is to be understood that it may be used for other purposes, and while the loader may be drawn by draft animals it is to be understood that the use of the power unit 45 is much to be preferred.

What is claimed is:—

1. A beet loader comprising a vehicle with inclined channel tracks on opposite sides, with the channels facing each other and each curved downwardly at the upper end, a carrier provided with rollers spaced apart lengthwise thereof and adapted to run in the channels, each curved portion having stop means at its extremity for the rollers, said stop means coöperating with the curved portions to tilt the carrier to dumping position, said stop means being removable so that the carrier may be replaced by another carrier.

2. A beet loader comprising a vehicle provided with inclined tracks, and a carrier movable along the tracks and comprising a series of laterally spaced angle fingers with a rod traversing the fingers at the angle and another rod traversing the fingers at the upper extremities, the last-named rod being continued beyond the sides of the carrier and there constituting journals, rollers mounted on the journals, and other rollers on the carrier extending beyond the sides thereof between the first-named rollers and the angle portion of the carrier with the rollers adapted to the tracks.

3. In a loader, a carrier for lifting material to be loaded, comprising a series of fingers spaced apart laterally of the direction of travel of the carrier, said fingers being each bent intermediately of its length, a rod traversing the fingers at the bent portions, another rod traversing the fingers at one extremity and projecting beyond the sides of the carrier, rollers mounted on the projecting ends of the second-named rod, and other rollers projecting beyond the sides of the carrier and located between the first-named rollers and the bent portions of the fingers.

4. In a loader, a carrier for lifting material to be loaded, comprising a series of fingers spaced apart laterally of the direction of travel of the carrier, said fingers being each bent intermediately of its length, a rod traversing the fingers at the bent portions, another rod traversing the fingers at one extremity and projecting beyond the sides of the carrier, rollers mounted on the projecting ends of the second-named rod, and other rollers projecting beyond the sides of the carrier and located between the first-named rollers and the bent portions of the fingers, each finger at the extremity remote from the first-named rod being provided with a block pivoted to the finger to have a limited rocking movement thereon about a substantially horizontal axis, the blocks when the carrier is in loading position being disposed in substantially horizontal planes.

5. In a loader, a carrier comprising a series of laterally spaced fingers, each finger at the lower end being provided with a block in the nature of an enlargement for protecting material gathered by the carrier, each block being of greater width than the finger on which it is mounted and each being pivoted to the respective finger to rock on a substantially horizontal axis.

In testimony that I claim the foregoing as my own, I have hereto affixed my signature.

WILLIAM MABLE.

Witnesses.
F. D. ABBOTT,
H. D. HUBBELL.